Figure 1:
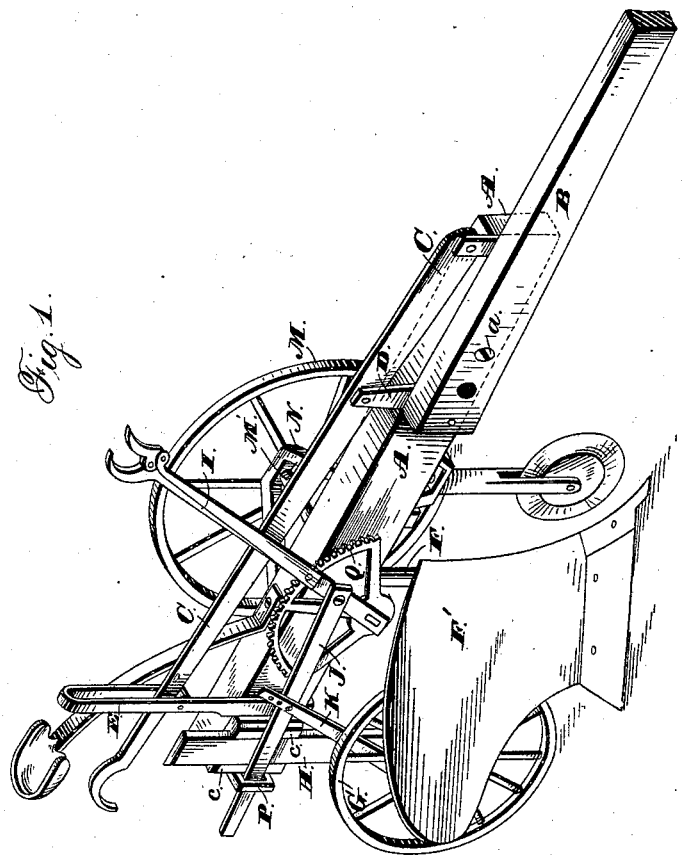

(No Model.)   J. R. ERVIN.   2 Sheets—Sheet 1.
SULKY PLOW.

No. 285,022.   Patented Sept. 18, 1883.

WITNESSES
Jas. E. Hutchinson.
S. G. Nottingham

INVENTOR
James R. Ervin
By H. A. Sugmom
Attorney (No Model.)  J. R. ERVIN.  2 Sheets—Sheet 2.
SULKY PLOW.
No. 285,022.  Patented Sept. 18, 1883.
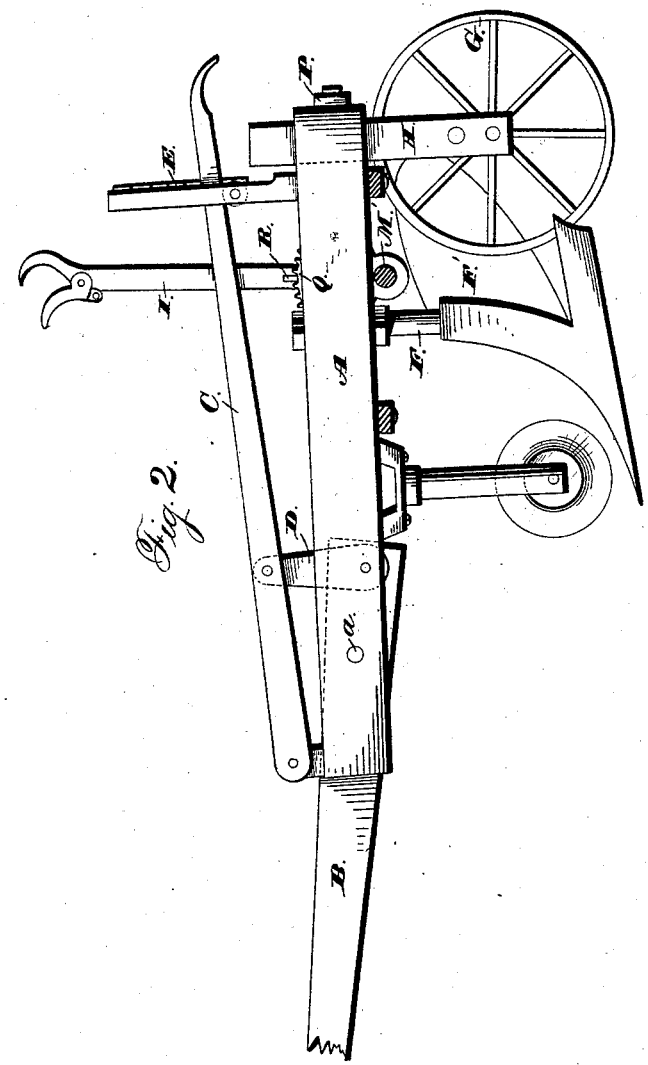

UNITED STATES PATENT OFFICE.

JAMES R. ERVIN, OF MARSHALL, MISSOURI.

SULKY-PLOW.

SPECIFICATION forming part of Letters Patent No. 285,022, dated September 18, 1883.

Application filed January 26, 1883. (No model.)

*To all whom it may concern:*

Be it known that I, JAMES R. ERVIN, of Marshall, in the county of Saline and State of Missouri, have invented certain new and useful Improvements in Sulky-Plows; and I do hereby declare the following to be a full, clear, and exact description of the invention, such as will enable others skilled in the art to which it pertains to make and use the same.

My invention relates to an improvement in sulky-plows; and it consists in the parts and combinations of parts, as will be more fully described, and pointed out in the claims.

In the accompanying drawings, Figure 1 is a view in perspective of my improvement; and Fig. 2 is a side view of the same, showing the landside of the plow.

A represents the main beam, to which the plow is secured, and B the supplemental beam, pivotally secured to the front end of the main beam by the bolt *a*.

C is a long lever, the front end of which is pivotally secured to the front end of the main beam A, and is provided near its front end with a depending pivoted arm, D, the lower end of which latter is pivotally secured to the supplemental beam B behind the pivot-bolt *a*. The rear end of this lever C terminates alongside of the driver's seat, so as to be within easy reach of the operator, and is regulated or held in position by the rack-bar E. By disengaging the lever from the rack-bar and moving it upward, the end of the main beam and the point of the plow are elevated, and by moving it downward the end of the beam and point are depressed, the degree of elevation or depression, however, being limited to the amount of movement of the lever.

F is a standard rigidly secured to the main beam A near its rear end, for the attachment of the plow F', which latter can be of any ordinary construction. The landside of the plow, however, tapers from the point to the rear end thereof, so that the entire weight of the plow and a portion of the weight of standard will fall directly on the small furrow-wheel G, which latter is secured indirectly to the rear end of the main beam. The furrow-wheel G is secured to the movable arm H, which latter has sliding bearing in the beam, and is adapted to follow in the furrow formed by the plow. The arm H moves vertically in the bearing *c*, secured to the rear end of the main beam A, and is operated by the hand-lever I through the intervention of the sliding bar J and the bar K, which will be hereinafter more particularly referred to. The lower end of the lever I is rigidly secured to the inner end of the axle, while the wheel M is secured to the outer or cranked end of the said axle M'. This axle is secured transversely to the under side of the main beam A, and is supported at its outer end by the skeleton frame N. When the hand-lever I is moved either backward or forward, the axle is turned so as to elevate or lower the plow-frame on the wheels. The sliding bar J is connected at its front end to the hand-lever I, and the rear end thereof passes through the guide-block P, secured to the rear end of the main beam. The lower end of the bar K is connected to the movable arm H, while the upper end thereof is connected to the sliding bar J. Thus it will be seen that as the sliding bar J is moved backward and forward the furrow-wheel is depressed and elevated simultaneously with the large wheel on the opposite side of the plow-frame by means of the hand-lever I. The lever I is held in position by the segment-rack Q and the pawl R. The plow-standard is so situated that the front edge of the plow will be in advance of the wheels, which brings the draft as near the plow as practicable, thereby preventing the waste of any power.

When it is desired to use the plow, the long lever C is depressed, which consequently depresses the front end of the main beam and depresses the plow. The hand-lever I is then thrown forward, which lowers the frame on the wheels and allows the plow to engage the ground. When it is desired to elevate the plow for any purpose whatever, the hand-lever I is moved backward, thereby elevating the frame and plow, and the lever C elevated, which elevates the front end of the main beam, and also slightly tips the plow-point upward.

This improvement is of few parts, can be manufactured and sold at a comparatively small cost, and is durable and effective in use.

It is evident that slight changes in the construction and relative arrangement of the several parts of my invention might be resorted to without departing from the spirit of my invention, and hence I would have it understood that I do not limit myself to the exact construction of parts shown and described, but consider myself at liberty to make such changes as fairly fall within the spirit and scope of my invention.

Having fully described my invention, what I claim as new, and desire to secure by Letters Patent, is—

1. The combination, with the crank-axle M', supporting-wheel M, rack Q, and lever I, secured to the end of axle M', of the furrow-wheel G, sliding standard H, sliding bar P, and connecting-bar K, substantially as set forth.

2. The combination, with the plow-beam, plow, skeleton frame, axle, large wheel, and furrow-wheel, the latter journaled on a vertically-movable slide, of the hand-lever rigidly secured to one end of the axle, the sliding bar J, and the bar K, all of the above parts combined and adapted to operate as described.

In testimony whereof I have signed this specification in the presence of two subscribing witnesses.

JAMES R. ERVIN.

Witnesses:
J. B. BREATHITT,
W. R. BRUCE.